(12) United States Patent
Hechler et al.

(10) Patent No.: US 12,551,957 B2
(45) Date of Patent: Feb. 17, 2026

(54) PROCESS OF GRINDING AND POLISHING GEAR WHEELS

(71) Applicant: 3M INNOVATIVE PROPERTIES COMPANY, St. Paul, MN (US)

(72) Inventors: Juergen Hechler, Kusterdingen (DE); Fynn Rosenau, Dormagen (DE); Marc Eberwein, Velbert (DE)

(73) Assignee: 3M Innovative Properties Company, St. Paul, MN (US)

( * ) Notice: Subject to any disclaimer, the term of this patent is extended or adjusted under 35 U.S.C. 154(b) by 222 days.

(21) Appl. No.: 18/013,011

(22) PCT Filed: Jun. 22, 2021

(86) PCT No.: PCT/IB2021/055513
§ 371 (c)(1),
(2) Date: Dec. 27, 2022

(87) PCT Pub. No.: WO2022/003489
PCT Pub. Date: Jan. 6, 2022

(65) Prior Publication Data
US 2023/0278120 A1    Sep. 7, 2023

(30) Foreign Application Priority Data
Jun. 30, 2020    (EP) .................................... 20183030

(51) Int. Cl.
*B23F 1/02*    (2006.01)
*B23F 19/00*    (2006.01)

(52) U.S. Cl.
CPC ............... *B23F 1/02* (2013.01); *B23F 19/00* (2013.01)

(58) Field of Classification Search
CPC .................................. B23F 1/02; B23F 19/00
See application file for complete search history.

(56) References Cited

U.S. PATENT DOCUMENTS

| | | | | |
|---|---|---|---|---|
| 3,552,261 A | * | 1/1971 | Hunkeler | B23F 9/10 409/29 |
| 4,961,289 A | | 10/1990 | Sulzer | |
| 9,718,139 B2 | | 8/2017 | Breith et al. | |
| 2005/0171631 A1 | * | 8/2005 | Arvin | G05B 19/4097 700/182 |
| 2009/0126178 A1 | * | 5/2009 | Kipping | B23P 21/004 29/283 |

(Continued)

FOREIGN PATENT DOCUMENTS

| | | |
|---|---|---|
| CN | 107081665 A | 8/2017 |
| CN | 107876904 A | 4/2018 |

(Continued)

OTHER PUBLICATIONS

Roughness Conversion Chart, Rampinelli S.P.A., Screen shot taken on Feb. 14, 2019, available at https://rampinelli.eu/wp-content/uploads/2018/01/Roughness-Conversion-Chart-Rampinelli.pdf (Year: 2019).*

(Continued)

*Primary Examiner* — Kyle A Cook (57) ABSTRACT

Process of grinding and polishing flank surfaces of teeth of toothed wheels, which includes a grinding device, a polishing device, a dynamic positioning device, and a toothed wheel.

13 Claims, 3 Drawing Sheets

(56) References Cited

U.S. PATENT DOCUMENTS

| | | | | |
|---|---|---|---|---|
| 2010/0261415 | A1* | 10/2010 | Wawro | B23F 19/00 |
| | | | | 451/47 |
| 2013/0121779 | A1* | 5/2013 | Geiser | B23F 19/10 |
| | | | | 409/8 |
| 2014/0234043 | A1* | 8/2014 | Nakahara | B23F 5/20 |
| | | | | 409/12 |
| 2015/0088298 | A1* | 3/2015 | Kurita | B23F 23/006 |
| | | | | 700/160 |
| 2015/0183078 | A1 | 7/2015 | Rizzo, Jr. et al. | |
| 2017/0261068 | A1* | 9/2017 | Zhao | B23F 9/082 |
| 2019/0232502 | A1 | 8/2019 | Naderer | |

FOREIGN PATENT DOCUMENTS

| | | |
|---|---|---|
| CN | 207547785 U | 6/2018 |
| CN | 207840896 U | 9/2018 |
| CN | 208100026 U | 11/2018 |
| CN | 208246586 U | 12/2018 |
| CN | 109570641 A | 4/2019 |
| CN | 209273137 U | 8/2019 |
| DE | 102009020771 A1 * | 11/2010 ............... B23C 3/12 |
| DE | 102012002126 A1 | 8/2013 |
| DE | 102013003769 A1 | 8/2014 |
| DE | 102018213131 A1 | 2/2020 |
| EP | 0316742 A2 | 5/1989 |
| EP | 2740568 A2 | 6/2014 |
| GB | 1280162 A | 10/1969 |

OTHER PUBLICATIONS

Extended European Search Report received for EP Patent Application No. 20183030.4, mailed on Dec. 2, 2020, 3 pages.

International Search Report received for PCT International Application No. PCT/IB2021/055513, mailed on Jul. 19, 2021, 5 pages.

* cited by examiner

PROCESS OF GRINDING AND POLISHING GEAR WHEELS

CROSS REFERENCE TO RELATED APPLICATIONS

This application is a national stage filing under 35 U.S.C. 371 of PCT/IB2021/055513, filed Jun. 22, 2021, which claims the benefit of EP application Ser. No. 20183030.4, filed Jun. 30, 2020, the disclosures of which are incorporated by reference in their entireties herein.

This disclosure relates to processes for grinding and polishing gear wheels.

In times of climate change vehicles are supposed to emit less carbon dioxide over their lifetime and generate less noise. Vehicle transmission gear boxes generate less noise and can remain in operation over more years and more kilometers if their gear wheels have smoother tooth flank surfaces where they contact other gear wheels and transmit torque. In manufacturing, gear wheels are ground into their final shape on grinding machines.

A traditional method for machining gear wheels is described in U.S. Pat. No. 4,850,155, which uses a tool in the form of a substantially involute worm whose active length is greater than the length of the working area and whose center distance from the gearwheel is changed during its feed motion in the diagonal direction from the axial and tangential directions to generate lateral crowning. U.S. Pat. No. 9,718,139 B2 describes tools for grinding toothed workpieces.

Where polishing is required, some traditional grinding machines contain a grinding zone and a polishing zone where, after grinding a gear wheel and its teeth, the flanks of these teeth are polished to a desired surface smoothness on the same machine. An example is a grinding/polishing machine that uses a so-called duo-wheel, i.e. a two-zone grinding worm tool which has a grinding zone and a polishing zone. Quite often the time spent for polishing a gear wheel on such a machine is longer than the time spent for grinding it. Grinding and polishing a gear wheel on the same machine can double the processing time, compared to the time needed to only grind the gear wheel.

Such traditional grinding machines are not set up to grind a second gear wheel while polishing the first gear wheel, so the machine is occupied by the first gear wheel while that gear wheel is ground and polished.

Grinding machines are expensive equipment. To use them in an economically most efficient way a gear wheel should occupy the grinding machine only for as little time as possible.

The present disclosure attempts to address this need. It provides, in a first fundamental aspect, a process of grinding and polishing a flank surface of a tooth of a first toothed wheel, the process comprising the steps, in this sequence, of a) providing a rotational grinding device for grinding a first portion and a second portion of a flank surface of a tooth of the first toothed wheel; providing a polishing device comprising a stationary axis and a polishing body rotatable about the stationary axis, the polishing body being adapted for polishing flank surfaces of teeth of a toothed wheel; and providing a dynamic positioning device for holding a toothed wheel and for dynamically adjusting position and attitude of the toothed wheel, relative to the stationary axis, during polishing; and providing a first toothed wheel;

b) having the grinding device grind a first portion and a second portion of a flank surface of a tooth of the first toothed wheel;

c) removing the first toothed wheel from the grinding device;

d) having the dynamic positioning device bring the first portion of the flank surface in contact with the rotating polishing body such that the first portion of the flank surface is polished by the polishing body;

e) having the dynamic positioning device dynamically adjust position and attitude of the first toothed wheel relative to the stationary axis, such that the second portion of the flank surface is polished by the polishing body.

Running the polishing part of the process on a separate device allows to grind a second toothed wheel on the grinding device while polishing the first toothed wheel on the separate polishing device. Polishing devices are generally less expensive than grinding machines, so that their degree of utilization is often less critical. Also, the use of a dynamic positioning device may provide greater flexibility in adjusting position and attitude of the toothed wheel during polishing than is available during polishing on a traditional grinding machine.

Grinding of gear wheels is often performed on grinding machines available from companies like Liebherr, Reishauer, Kapp-Niles, and Samputensili. Grinding wheels such as, for example, 3M™ Vitrified Grinding Wheel 22VD, 3M™ Vitrified Grinding Wheel 33VB or 3M™ Cubitron™ II Vitrified Grinding Wheel 92VJ, (all available from 3M Company, St. Paul, Minnesota, U.S.A.) may be used for grinding.

As used herein, the term "polishing" refers to polishing using bonded abrasives, such as, for example, using a polishing disk. Suitable polishing materials for use in processes according to the present disclosure are, for example, A800 PL6966 polyurethane-bonded of Artifex, Kaltenkirchen, Germany, or "3M™ Scotch-Brite DB-WL 7S fine" disks from 3M Company of St. Paul, Minnesota, U.S.A.

Polishing generally provides a smoother surface than grinding. Polishing a surface portion of a tooth flank after grinding provides for a smoother surface in the surface portion, i.e. smoother than the surface portion was after grinding. The smoother surface can transmit torque to an adjacent gear wheel with less frictional losses and at lower noise levels, and generally provides a larger lifetime of the wheel.

According to the present disclosure, the toothed wheel may be, for example, a cog wheel, a gear pinion, a sprocket, a crown wheel, a bevel gear, or any other gear wheel, such as for use in a transmission gear box of a vehicle or of a wind power generator. Processes according to the present disclosure may have particularly good use in manufacturing of toothed wheels for transmission gears of heavy vehicles such as trucks or tractors or construction work vehicles. The high-quality surface obtained by using a dynamic positioning device in the polishing step may help increase the contact surface between teeth of opposed gear wheels and reduce wear, thus extending the usable lifetime of the gear wheels.

Hence generally, in certain embodiments of a process according to the present disclosure, the first toothed wheel is a gear wheel for use in a gear box of a heavy vehicle, such as a truck, a tractor, a bus, a coach, a railway locomotive, or a construction work vehicle, or of a wind power generator. The first toothed wheel may be a gear wheel for use in a gear box of a construction machine or of a stone mill.

Gear wheels for use in a gear box of a heavy vehicle, such as a truck or a tractor or a construction work vehicle, or of a wind power generator are generally larger gear wheels. Typically, they have outer diameters of 100 millimeters or more, some up to 2 or 3 meters, e.g. in wind power generators. Some have a gear width of 20 millimeters or more, others may be as wide as 200 or even 400 millimeters or more. Certain ones of those gear wheels are helical gear wheels. Therefore, in certain processes according to the present disclosure, the first toothed wheel has a diameter of 100 millimeters or more and/or the first toothed wheel has a weight of 1000 grams or more and/or wherein the first toothed wheel has a gear width of 20 millimeters or more, and/or wherein the first toothed wheel is a helical gear wheel.

In certain embodiments the first toothed wheel is a gear wheel made of steel or iron. It may be a gear wheel made, for example, of cast steel, gray iron, spherulitic graphite iron, or cast iron. Steel and cast iron are common materials for gear wheels and readily available at moderate cost.

A tooth of a toothed wheel has surfaces facing a respective adjacent tooth of the same wheel. These surfaces are referred to herein as flank surfaces of a tooth. They extend generally in radial directions, away from the hub of the wheel, as opposed to circumferential directions. Portions of the flank surfaces get in contact with portions of corresponding flank surfaces of another toothed wheel as the wheels turn, and mechanical forces and torque are transmitted between the wheels via these tooth flank surfaces. In order to reduce noise of the transmission gear and extend the usable life of the toothed wheels in it, it is helpful to polish the flank surfaces of the teeth of the toothed wheels.

A grinding device useable in the process according to the present disclosure may be, for example, a stationary grinding machine, suitable for grinding toothed wheels for use in transmission gearboxes of vehicles, e.g. vehicles like trucks or tractors, or of wind power generators.

The grinding device may be, for example, a rotational grinding device. It may comprise a stationary rotational axis on which a toothed wheel can be mounted for grinding.

A grinding device useable in a process according to the present disclosure may comprise a grinding disk or a helical grinding tool, shaped and arranged suitably for grinding portions of flank surfaces of teeth of toothed wheels, e.g. toothed wheels for use in transmission gearboxes of vehicles or wind power generators. Examples of such grinding devices are Holroyd GTG2, Liebherr LGG280 or other grinding machines available, for example, from Liebherr, Klingelnberg, or Gleason.

The grinding device may be adapted to grind the flank surface of teeth of the first toothed wheel to a surface roughness Rz of 3.5 micrometers or less, as measured using a stylus method and an inductive skidded probe, using a stylus radius of 5 micrometers and a tip angle of 60° per DIN EN ISO 3274 as in force on 29 Jun. 2020. A MarSurf M300 instrument from Mahr GmbH, Goettingen, Germany, can be used, for example, to perform the measurement. This surface roughness is generally adequate for obtaining acceptable processing times in the subsequent polishing step.

A polishing device useable in processes according to the present disclosure may be, for example, a bench grinder equipped with a rotatable polishing body, e.g. a polishing disk or a polishing wheel. The polishing device and the polishing body are adapted to increase the smoothness and to reduce surface roughness of a tooth flank that has previously been ground by the grinding device.

According to the present disclosure, the polishing device is a separate device from the grinding device. It can, for example, be moved and/or operated independently from the grinding device. It can be operated at speeds which are independent from operating speeds of the grinding device.

In certain embodiments the polishing device is adapted to polish the flank surface of the tooth of the first toothed wheel to a surface roughness Rz of 1.2 micrometers or less, as measured using a stylus method and an inductive skidded probe, using a stylus radius of 5 micrometers and a tip angle of 60° per DIN EN ISO 3274 as in force on 29 Jun. 2020. Rz refers, as is usual, to the maximum height of the profile. This surface roughness is generally adequate for obtaining a lower noise level and an acceptable prolongation of lifetime of a gear wheel through reduced frictional losses and associated less wear. In certain of these embodiments the polishing device is adapted to polish the flank surface of the tooth of the first toothed wheel to a surface roughness Rz of 1.2 micrometers or less and Ra of 0.2 micrometers or less. Ra refers, as is commonly known, to the arithmetic mean deviation of the profile. Again, a MarSurf M300 instrument from Mahr GmbH, Goettingen, Germany, can be used, for example, to determine Rz and Ra.

In certain embodiments of processes according to the first fundamental aspect of the present disclosure, the polishing device is a bench grinder. The bench grinder comprises a stationary axis and the polishing body for polishing the first toothed wheel which is being positioned and oriented by the dynamic positioning device. The polishing body is mounted on the stationary axis. A bench grinder is available readily and at moderate cost, resulting in more economic manufacturing of the toothed wheel. Embodiments according to the first fundamental aspect of the present disclosure are preferred particularly where the toothed wheel is light enough to be reliably held, positioned and oriented by the positioning device such as a multi-axis robot.

The polishing body rotates about the stationary axis of the polishing device and is adapted for polishing flank surfaces of teeth of a toothed wheel. The polishing body may be, for example, a polishing disk or a deburring disk or, generally, an abrasive wheel or an abrasive disk. In certain embodiments the polishing body comprises a nonwoven material. In certain embodiments the polishing body is made of a nonwoven material. Polishing bodies comprising a nonwoven material have a certain flexibility and can therefore conform to the shape of the tooth flank better than polishing bodies from many other materials.

Suitable polishing bodies for certain toothed wheels are, for example, 3M Scotch-Brite™DB-WL deburring wheels or Artifex A800 polyurethane-bonded grinding wheels.

The polishing body may be suitable for reducing surface roughness Rz to below 1.2 micrometers (μm), or to below 1 μm or to below 0.5 μm. The polishing body may be suitable for reducing surface roughness Rz from above 2 micrometers to below 1.2 μm.

According to the first fundamental aspect of the present disclosure, the polishing body can rotate about a stationary axis, i.e. the axis is fixed in position and attitude relative to the mounting of the polishing device, as opposed to the process according to the second fundamental aspect of this disclosure, in which the position and orientation of the rotating polishing body are dynamically adjusted.

The polishing body is adapted for polishing flank surfaces of teeth of toothed wheels. It may be adapted therefor, for example, by having a contour which makes it fit between two adjacent teeth of the toothed wheel, or by having a hardness, grain size or composition which facilitates polishing of flank surfaces of toothed wheels for use in transmission gearboxes of vehicles or of wind power generators, such wheels being typically made of steel or iron and having certain sizes and contours.

The dynamic positioning device is suitable for holding a toothed wheel during polishing of the wheel on the polishing device, and for dynamically adjusting position and attitude of the toothed wheel, relative to the stationary axis, during polishing of the wheel on the polishing device. In such processes the polishing body may be rotatably mounted on the stationary axis.

In processes according to a second fundamental aspect of this disclosure explained below, the dynamic positioning device is suitable for dynamically positioning a rotating polishing body, adapted for polishing flank surfaces of teeth of a toothed wheel, and is suitable for dynamically adjusting position and attitude of the rotating polishing body relative to the toothed wheel during polishing of the wheel on the polishing device. In such processes the toothed wheel may be rotatably mounted on a stationary axis.

In processes according to the first fundamental aspect, the dynamic positioning device may, for example, comprise engagement means to engage with a central bore of the toothed wheel, or it may comprise a clutch or a pincer or a gripper to grip the wheel firmly enough to hold it during polishing of the wheel on the polishing device. The positioning device may be operable to hold the toothed wheel such that it can bring the wheel in contact with the polishing body in a controlled manner, as required for successful polishing.

In certain embodiments of the processes according to the present disclosure, the dynamic positioning device is a robot or a robotic positioning device. An example of a suitable robot is a Kuka KR 60 HA robot, available from Kuka AG, Augsburg, Germany. The dynamic positioning device may be a multi-axis robot or a multi-axis robotic positioning device, such as a 5-axis robot or a 6-axis robot. Hence, in certain processes according to the first fundamental aspect of the present disclosure, the dynamic positioning device is a software-controlled robot comprising a plurality of segments and four, five or six axes about which the segments can be independently rotated, whereby the position and attitude of the first toothed wheel are dynamically adjusted by rotating one or more of the axes.

Generally, robots are deemed to be particularly suitable for being used as positioning devices in processes according to the present disclosure, because they allow to adjust very precisely and very quickly the position and attitude of the toothed wheel or of a polishing body dynamically, i.e. they can be programmed to move the toothed wheel along the rotating polishing body—or move the rotating polishing body along the toothed wheel—very precisely and at the most appropriate speed such that all required portions of a tooth flank are evenly polished with an adequate amount of pressure and for an adequate time span.

The dynamic adjustment of position and attitude refers to the ability to adjust these parameters continuously (or in very small steps if digitized) as the toothed wheel is polished. Polishing adjacent surface portions of a tooth flank can thus be done in a continuous movement of the wheel—or of the polishing body—without moving the wheel and the polishing body away from each other. This could minimize the time for polishing all tooth flanks of the toothed wheel, resulting in higher productivity and efficient use of machine time.

For high-precision polishing of the tooth flanks of a toothed wheel it may be advantageous to equip the positioning device with a sensor to sense the contact force between the flank surface and the polishing body. The positioning device may dynamically adjust position and attitude in reaction to the output of the sensor, thereby optimizing the result of the polishing process. A sound sensor may be useful to detect a contact between the polishing body and the toothed wheel. Therefore, in certain processes according to the present disclosure, the robot comprises a sensor for sensing a force, or a contact pressure, exerted by the polishing body on the first toothed wheel, and/or a sensor for sensing a sound, and the robot dynamically adjusts position and attitude in response to an output of the sensor(s).

Independent from a sensor being present in the positioning device or not, it may be advantageous to vary the contact pressure between the flank surface and the polishing body as the polishing body polishes the first portion and then the second portion of the flank surface. More generally, it may be advantageous to vary the contact pressure as different portions of a tooth are polished. Portions of the tooth flank that in use will have little contact with an opposed toothed wheel may need less pressure in polishing than portions having much contact.

Therefore, in certain processes according to the present disclosure, the dynamic positioning device dynamically adjusts position and attitude such that the second portion is polished at a second contact pressure different from a first contact pressure at which the first portion is polished.

As stated above, it is an important aspect of the present disclosure that the toothed wheel, after the grinding step on the grinding device, is removed from the grinding device without having to be polished on the grinding device. Instead, the wheel is polished on the separate polishing device, which allows the grinding device to quickly start grinding a second, subsequent toothed wheel. Polishing of the first toothed wheel and grinding of the second toothed wheel can thus be done in parallel.

The toothed wheel may be mounted on the grinding device in order to be ground. The toothed wheel, after the grinding step on the grinding device, may be unmounted and removed from the grinding device without having to be polished on the grinding device. Hence in certain embodiments, step c) of the process described above may be a step of c) unmounting and removing the first toothed wheel from the grinding device.

According to the present disclosure, the grinding device and the polishing device are separate devices. Therefore, the polishing device may have a rotational axis for mounting the toothed wheel thereon, separate from a rotational axis of the grinding device. The rotational axis of the polishing device may have an orientation different from an orientation of a rotational axis of the grinding device. The rotational axis of the polishing device may rotate at a rotational speed which is independent from a rotational speed of the rotational axis of the grinding device. The polishing device may be controlled by a control instrument different from a control instrument controlling the grinding device.

In certain processes according to the present disclosure the dynamic positioning device performs the step of removing the first toothed wheel from the grinding device. Removal of the toothed wheel from the grinding device after finishing the grinding step may be performed by the same positioning device which may later hold and position the wheel during the polishing step. Having the positioning device remove the wheel from the grinding device is a typical task for positioning devices, so that the positioning device may be able to perform this task with particular speed or particular precision.

Alternatively, a separate handling device or a human operator may remove the wheel from the grinding device.

Bringing a portion of a flank surface of a tooth of a toothed wheel in contact with the rotating polishing body is performed in a way such that the polishing body polishes the flank surface during the contact.

In certain embodiments the second portion of the flank surface of a tooth of the first toothed wheel is polished by the rotating polishing body while the rotating polishing body remains in contact with the first toothed wheel. In such embodiments the polishing process may be a continuous process in which the polishing body is not removed from the toothed wheel. Such a continuous process may result in a smoother flank surface and may be more efficient as it may avoid loss of time needed for moving the toothed wheel away from the rotating polishing body and for moving it back towards the polishing body.

A benefit of the processes according to the present disclosure is that the expensive grinding device is only used for grinding, not for polishing, so that it its expensive utilization is limited to the process step of grinding, and the process step of polishing is performed on a separate—typically less expensive—polishing device. This separation facilitates simultaneous processing of two toothed wheels: a first toothed wheel is being polished on the polishing device while a second toothed wheel is being ground on the grinding device. This parallel processing of two toothed wheels yields economic benefits and may result in lower production cost of toothed wheels.

Therefore, in certain embodiments of the processes according to the present disclosure, the second portion of the flank surface of the first toothed wheel is polished by the rotating polishing body, while the grinding device grinds a portion of a second toothed wheel.

While the first fundamental aspect of the present disclosure is directed to processes in which the polishing body is mounted on a stationary axis and the dynamic positioning device adjusts position and attitude of the first toothed wheel relative to the rotating polishing body for polishing the toothed wheel, the benefit of performing polishing on a separate device can also be obtained by processes in which the first toothed wheel is mounted on a stationary axis and the dynamic positioning device adjusts position and attitude of the rotating polishing body to polish the flanks of the teeth of the first toothed wheel.

Therefore, the present disclosure also provides, in a second fundamental aspect, a process of grinding and polishing a flank surface of a tooth of a first toothed wheel, the process comprising the steps, in this sequence, of
  a) providing a rotational grinding device for grinding a first portion and a second portion of a flank surface of a tooth of the first toothed wheel; providing a polishing device comprising a rotatable polishing body and a dynamic positioning device for dynamically positioning the rotating polishing body, adapted for polishing flank surfaces of teeth of a toothed wheel, and for dynamically adjusting position and attitude of the rotating polishing body relative to the toothed wheel during polishing; and providing a first toothed wheel;
  b) having the grinding device grind a first portion and a second portion of a flank surface of a tooth of the first toothed wheel;
  c) removing the first toothed wheel from the grinding device;
  d) having the dynamic positioning device bring the rotating polishing body in contact with the first portion of the flank surface such that the first portion of the flank surface is polished by the polishing body;
  e) having the dynamic positioning device dynamically adjust position and attitude of the rotating polishing body relative to the first toothed wheel, such that the second portion of the flank surface is polished by the rotating polishing body.

The features, advantages and benefits described above for processes according to the first fundamental aspect of this disclosure, as described above, apply correspondingly to processes according to this second fundamental aspect.

In certain processes according to the second fundamental aspect of the present disclosure the first toothed wheel is a gear wheel for use in a gear box of a heavy vehicle, such as a truck, a tractor, a bus, a coach, a railway locomotive or a construction work vehicle, or of a wind power generator.

In certain processes according to the second fundamental aspect of the present disclosure the first toothed wheel has a diameter of 150 millimeters or more and/or the first toothed wheel has a weight of 1000 grams or more and/or the first toothed wheel has a gear width of 30 millimeters or more and/or the first toothed wheel is a helical gear wheel.

In certain processes according to the second fundamental aspect of the present disclosure the first toothed wheel is a gear wheel made of steel or iron.

In certain processes according to the second fundamental aspect of the present disclosure the grinding device is adapted to grind the flank surface of the tooth of the first toothed wheel to a surface roughness Rz of 3.5 micrometers or more, as measured using a stylus method and an inductive skidded probe, using a stylus radius of 5 micrometers and a tip angle of 60° per DIN EN ISO 3274 as in force on 29 Jun. 2020.

In certain processes according to the second fundamental aspect of the present disclosure the polishing device is adapted to polish the flank surface of the tooth of the first toothed wheel to a surface roughness Rz of 1.2 micrometers or less, as measured using a stylus method and an inductive skidded probe, using a stylus radius of 5 micrometers and a tip angle of 60° per DIN EN ISO 3274 as in force on 29 Jun. 2020. Rz refers again, as is usual, to the maximum height of the profile. In certain of these embodiments the polishing device is adapted to polish the flank surface of the tooth of the first toothed wheel to a surface roughness Rz of 1.2 micrometers or less and Ra of 0.2 micrometers or less. Ra refers to the arithmetic mean deviation of the profile.

In certain processes according to the second fundamental aspect of the present disclosure the polishing body may be, for example, a polishing disk or a deburring disk or, generally, an abrasive wheel or an abrasive disk. In certain processes according to the second fundamental aspect of the present disclosure the polishing body comprises a nonwoven material. In certain embodiments according to the second fundamental aspect of the present disclosure the polishing body is made of a nonwoven material.

In certain processes according to the second fundamental aspect of the present disclosure, the dynamic positioning device is a software-controlled robot comprising a plurality of segments and four, five or six axes about which the segments can be independently rotated, whereby the position and attitude of the polishing body are dynamically adjusted by rotating one or more of the axes.

In certain of these processes the robot comprises a sensor for sensing a force, or a contact pressure, exerted by the polishing body on the first toothed wheel, and the robot dynamically adjusts position and attitude in response to an output of the sensor. Alternatively, or in addition, the robot may comprise a sound sensor for sensing a contact between the polishing body and the first toothed wheel. The robot may dynamically adjust position and attitude in response to an output of the sound sensor.

In certain processes according to the second fundamental aspect of the present disclosure the dynamic positioning device dynamically adjusts position and attitude such that the second portion is polished at a contact pressure different from the contact pressure at which the first portion is polished.

In certain processes according to the second fundamental aspect of the present disclosure the dynamic positioning device performs the step of removing the first toothed wheel from the grinding device.

In certain processes according to the second fundamental aspect of the present disclosure the second portion of the flank surface of a tooth of the first toothed wheel is polished by the rotating polishing body while the rotating polishing body remains in contact with the first toothed wheel.

In certain processes according to the second fundamental aspect of the present disclosure the second portion of the flank surface of the first toothed wheel is polished by the rotating polishing body, while the grinding device grinds a portion of a second toothed wheel.

Processes according to the present disclosure will now be described in more detail with reference to the following Figures exemplifying a process of the prior art and particular embodiments of the inventive processes.

Figure 1:
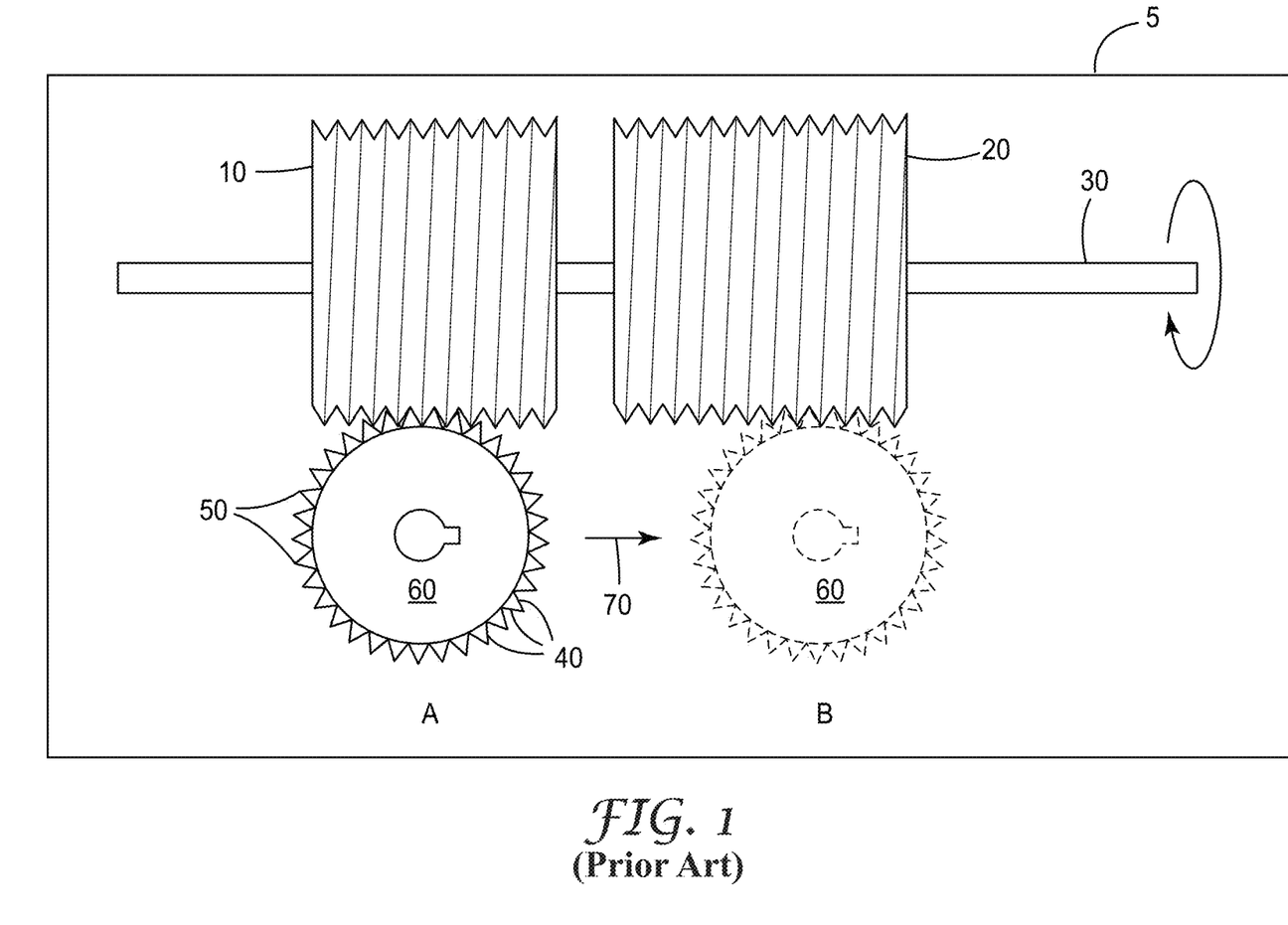
FIG. 1 Side view of a grinding and polishing station of a grinding machine performing a process of the prior art.

FIG. 1 illustrates, in a side view, a grinding and polishing station of a grinding machine 5 performing a process known from the prior art. In this traditional process, a worm-shaped grinding wheel 10 and a worm-shaped polishing wheel 20 are arranged on a rotating axis 30 of a traditional grinding machine 5. The grinding wheel 10 is shown grinding flank surfaces 40 of teeth 50 of a toothed gear wheel 60.

Once grinding of the flank surfaces 40 is accomplished, the traditional machine 5 moves the gear wheel 60 from a grinding position A, in which the gear wheel 60 is ground by the grinding wheel 10, in a direction indicated by arrow 70, parallel to the axis 30, into a polishing position B, in which the gear wheel 60 is polished by the polishing wheel 20 to achieve a smoother surface of the tooth flanks 40 previously ground by the grinding wheel 10. The same gear wheel 60, drawn in solid lines in its grinding position A opposite to the grinding wheel 10, is drawn in polishing position B in dashed lines to indicate its location some time after grinding.

Traditional grinding machines like the machine 5 illustrated in FIG. 1 are not designed to process two gear wheels 60 simultaneously. A hypothetical set-up in which a first gear wheel would be polished in the polishing position B by the polishing wheel 20 while a second gear wheel would be ground in the grinding position A by the grinding wheel 10 does not work today, at least for the reason that the axis 30 is common to both the grinding wheel 10 and the polishing wheel 20. For grinding tooth flanks 40 using the grinding wheel 10, the axis 30 moves linearly back and forth in a direction orthogonal to the plane of the drawing at a certain linear speed, which speed is generally higher than the linear speed required for polishing the tooth flanks 40 using the polishing wheel 20.

Hence when the gear wheel 60 is moved from the grinding position A into the polishing position B, and before the polishing process starts, the linear speed of linear movement of the axis in a direction orthogonal to the plane of the drawing is reduced.

Figure 2:
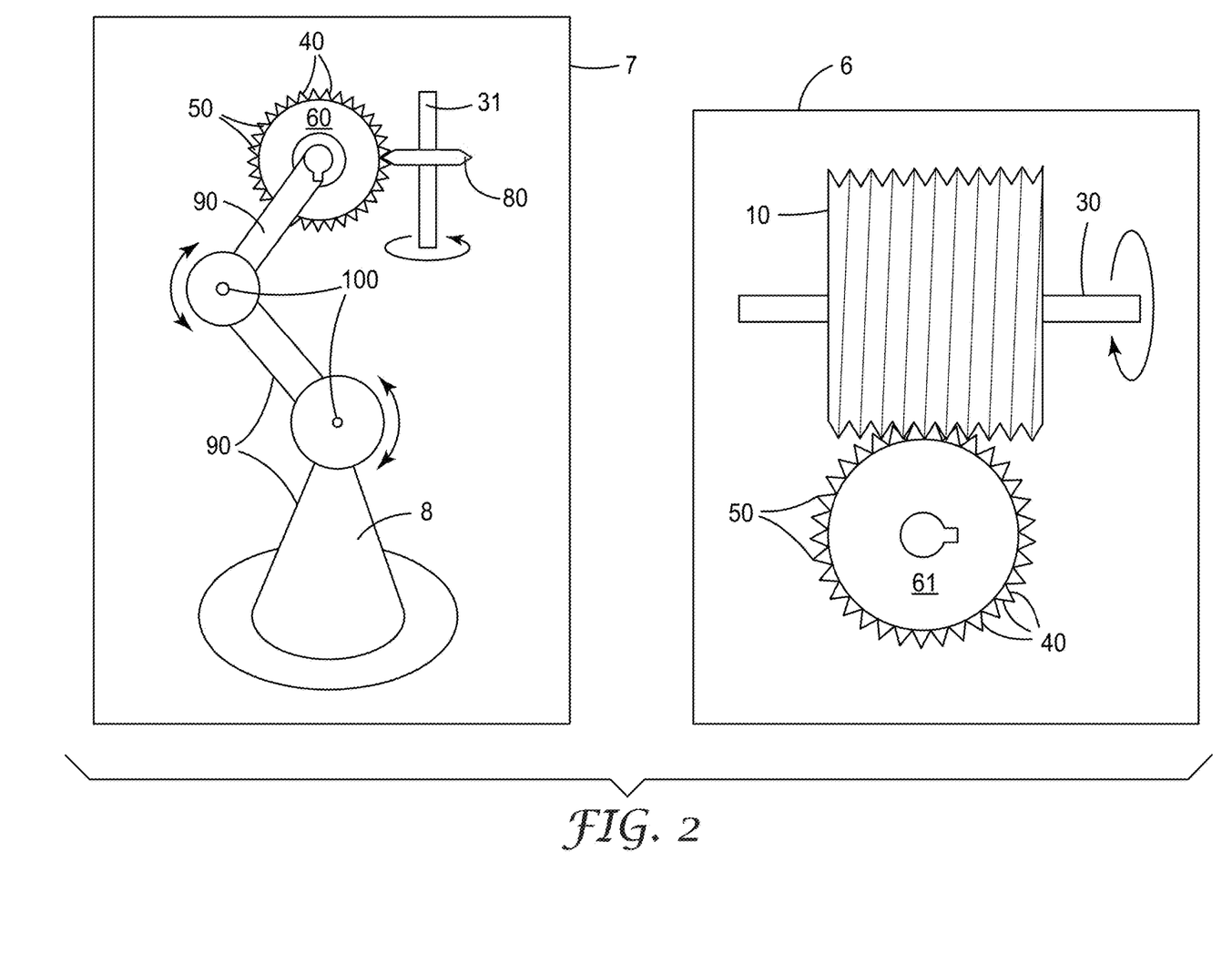
FIG. 2 Side view of a grinding device, of a polishing device and of a positioning device performing a first process according to the present disclosure.

FIG. 2 illustrates, in a side view, a first process according to the present disclosure. A grinding device 6, e.g. a grinding machine like the machine 5 illustrated in FIG. 1, comprises a worm-shaped grinding wheel 10, arranged on a rotating axis 30 of the grinding device 6. The grinding wheel 10 is shown grinding flank surfaces 40 of teeth 50 of a second toothed gear wheel 61, similar to what was explained for the grinding position A in FIG. 1.

Different from the prior art process shown in FIG. 1, the grinding device 6 does not perform polishing of the tooth flanks 40 of the second gear wheel 61. Instead, the second gear wheel 61 is unmounted from the grinding device 6, removed from the grinding device 6 and moved to a separate polishing device 7, outside the grinding device 6.

The polishing device 7 is a bench grinder 7 in which a polishing body 80 rotates about a fixed (i.e. stationary) axis 31. The polishing body 80 is a 3M™ Scotch-Brite™ DB-WL 7S Fine deburring wheel, available from 3M Company, St. Paul, Minnesota, USA. With this polishing body 80, on certain gear wheels, a surface smoothness exhibiting an Rz of less than 1.0 micrometer and an Ra of less than 0.2 micrometer can be achieved.

For polishing a gear wheel 60, the gear wheel 60 is held by a positioning device 8 which brings certain flank surfaces 40 of the teeth 50 of the gear wheel 60 in contact with the rotating polishing body 80.

The positioning device 8 is a software-controlled multi-axis robot 8, such as a Kuka KR 60 HA robot from Kuka AG, Augsburg, Germany. It comprises three segments 90 and six axes 100 of which only two are visible in FIG. 2, about which axes 100 the segments 90 can be independently rotated. This allow for a great flexibility in positioning and adjusting the attitude of the first gear wheel 60 relative to the polishing body 80, and thereby for high-quality polishing.

In order to polish the flank surfaces 40 adequately, the robot 8 positions the gear wheel 60 suitably for the polishing body 80 to polish a first portion of a specific flank surface 40, and then continuously and dynamically adjusts the position and attitude of the gear wheel 60 relative to the stationary axis 31, such that a second portion of that flank surface 40, adjacent to the first portion, is polished by the polishing body 80. This is performed for all portions of flank surfaces 40 which are supposed to be polished, and for all teeth 50 of the gear wheel 60.

As FIG. 2 illustrates, a second gear wheel 61 can be ground on the grinding device 6 while a first gear wheel 60 is being polished on the polishing device 7, the first gear wheel 60 having been ground previously on the grinding device 6. The grinding device 6 performs grinding only, so that a "grind-only" process for one single gear wheel 60, 61 can be performed in less time than the traditional "grind and polish" process on the grinding machine 5 of FIG. 1.

While the grinding device 6 is a high-cost high-precision machine, the polishing device 7 in conjunction with the positioning device 8 are typically less expensive. Separating the lower-value polishing operation on the polishing device 7 from the high-value grinding operation on the grinding device 6 optimizes the return on investment of the grinding device 6 and brings economic benefits.

Figure 3:
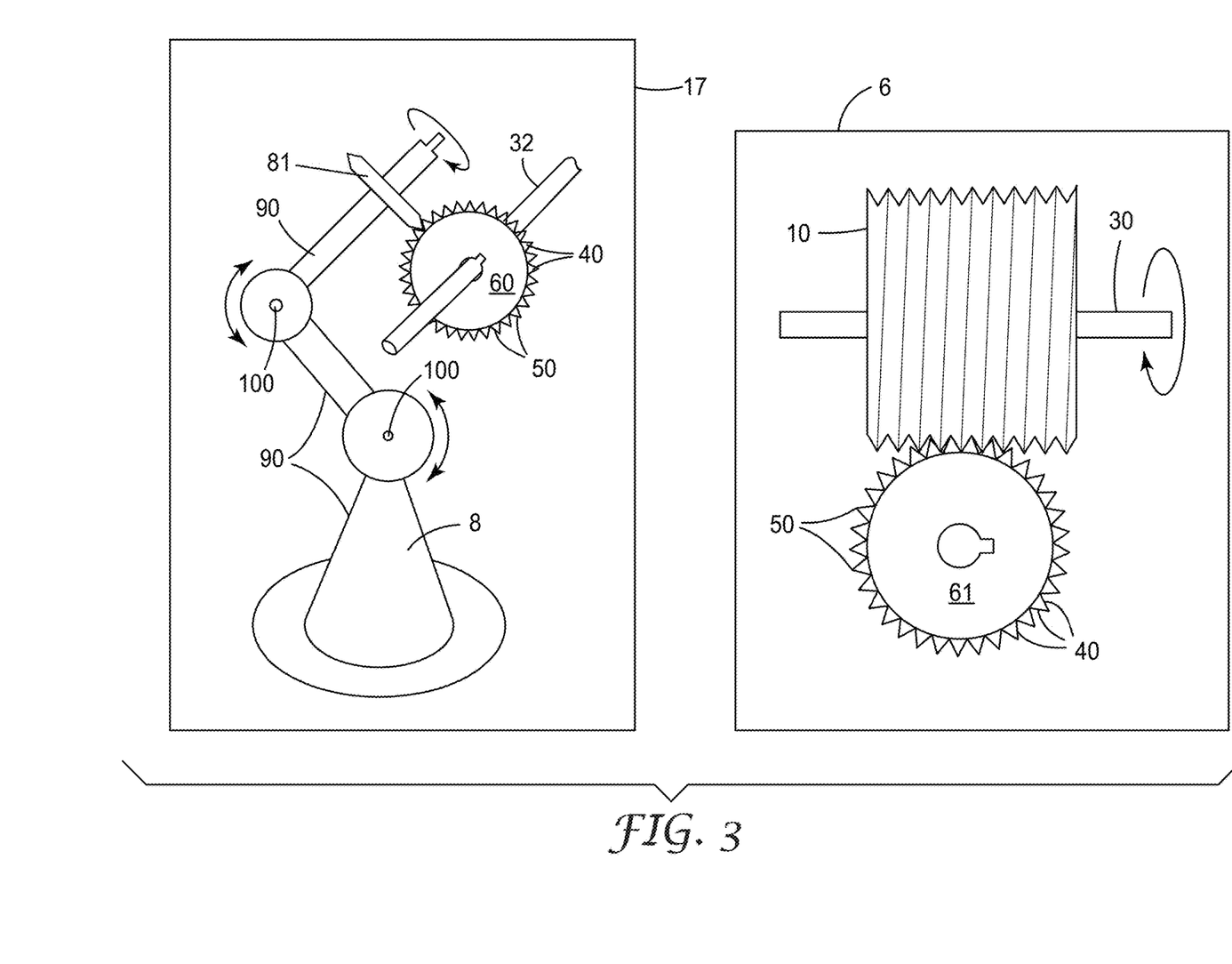
FIG. 3 Side view of a grinding device, of a polishing device and of a positioning device performing a second process according to the present disclosure.

In an alternative process according to the present disclosure, the polishing body is mounted on the dynamic positioning device which polishes the stationary gear wheel by dynamically adjusting position and attitude of the polishing body relative to the gear wheel. Such an embodiment is illustrated in FIG. 3, which is a side view of a grinding device 6 and a polishing device 17 comprising a dynamic positioning device 8. The grinding device 6 is identical to the grinding device 6 of FIG. 2. The polishing device 17, however, is different in that the positioning device 8 holds a rotating polishing body 81 which it dynamically positions and orients to polish flank surfaces 40 of teeth 50 of a first gear wheel 60. The positioning device 8 again is a multi-axis robot 8, identical to the robot 8 described in the context of FIG. 2. It is equipped with a mechanism to securely engage the polishing body 81 and rotate it at adequate speeds. The positioning device 8 brings the rotating polishing body 81 in contact with the first portion of the flank surface 40 for polishing the first portion, and thereafter dynamically adjusts the position and attitude of the polishing body 81 relative to the first gear wheel 60 such that the second portion of the flank surface is polished by the polishing body 81.

The first gear wheel 60 is mounted on a stationary axis 32 so that it can rotate slowly about this axis 32 to facilitate polishing of all its teeth 50. While the polishing device 17 polishes the teeth 50 of the first gear wheel 60, which had been ground on the grinding device 6 previously, the grinding device 6 simultaneously grinds a second gear wheel 61.

The invention claimed is:

1. A process of grinding and polishing a flank surface of a tooth of a first toothed wheel, comprising:
   a) providing a first toothed wheel, providing a rotational grinding device for grinding a first portion and a second portion of a flank surface of a tooth of the first toothed wheel;
   providing a polishing device comprising a stationary axis and a polishing body rotatable about the stationary axis, the polishing body being for polishing flank surfaces of teeth of toothed wheel; and providing a dynamic positioning device for holding the toothed wheel and for dynamically adjusting position and attitude of the toothed wheel, relative to the stationary axis, during polishing;
   b) grinding with the grinding device the first portion and the second portion of the flank surface of the tooth of the first toothed wheel;
   c) removing the first toothed wheel from the grinding device with the dynamic positioning device;
   d) positioning with the dynamic positioning device the first portion of the flank surface in contact with the rotating polishing body such that the first portion of the flank surface is polished by the polishing body; and
   e) adjusting position and attitude of the first toothed wheel relative to the stationary axis, such that the second portion of the flank surface is polished by the polishing body.

2. The process according to claim 1, wherein the polishing device is a bench grinder.

3. The process according to claim 1, wherein the second portion of the flank surface is polished by the rotating polishing body, while the grinding device grinds a portion of a second toothed wheel.

4. The process according to claim 1, wherein the second portion of the flank surface is polished by the rotating polishing body, while the rotating polishing body remains in contact with the first toothed wheel.

5. The process according to claim 1, wherein the dynamic positioning device dynamically adjusts position and attitude such that the second portion is polished at a second contact pressure different from a first contact pressure at which the first portion is polished.

6. The process according to claim 1, wherein the polishing body comprises a nonwoven material.

7. The process according to claim 1, wherein the grinding device is adapted to grind the flank surface of the tooth of the first toothed wheel to a surface roughness Rz of 3.5 micrometers or more.

8. The process according to claim 1, wherein the polishing device is adapted to polish the flank surface of the tooth of the first toothed wheel to a surface roughness Rz of 1.2 micrometers or less.

9. The-process according to claim 1, wherein the first toothed wheel is a gear wheel for use in a gear box of a vehicle or of a wind power generator.

10. The process according to claim 1, wherein the first toothed wheel is a gear wheel made of steel or iron.

11. The process according to claim 1, wherein the first toothed wheel has a diameter of 100 millimeters or more and/or the first toothed wheel has a weight of 1000 grams or more and/or wherein the first toothed wheel has a gear width of 20 millimeters or more and/or wherein the first toothed wheel is a helical gear wheel.

12. The process according to claim 1, wherein the dynamic positioning device is a software-controlled robot comprising a plurality of segments and four, five or six axes about which the segments can be independently rotated, whereby the position and attitude of the first toothed wheel are dynamically adjusted by rotating one or more of the axes.

13. The process according to claim 12, wherein the robot comprises a sensor for sensing a force, or a contact pressure, exerted by the polishing body on the first toothed wheel and a sensor for sensing a sound, and wherein the robot dynamically adjusts position and attitude in response to an output of the sensor(s).

* * * * *